(12) United States Patent
Yu et al.

(10) Patent No.: US 10,761,566 B2
(45) Date of Patent: Sep. 1, 2020

(54) ELECTRONIC APPARATUS AND METHOD FOR PROCESSING INFORMATION

(71) Applicants: Beijing Lenovo Software Ltd., Beijing (CN); Lenovo (Beijing) Co., Ltd., Beijing (CN)

(72) Inventors: Ming Yu, Beijing (CN); Yaojiang Du, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 341 days.

(21) Appl. No.: 14/230,125

(22) Filed: Mar. 31, 2014

(65) Prior Publication Data

US 2015/0091781 A1 Apr. 2, 2015

(30) Foreign Application Priority Data

Sep. 27, 2013 (CN) .......................... 2013 1 0452973
Feb. 19, 2014 (CN) .......................... 2014 1 0056754

(51) Int. Cl.
  *G06F 1/16* (2006.01)
  *G02B 27/01* (2006.01)
  *G06F 3/01* (2006.01)

(52) U.S. Cl.
  CPC .......... *G06F 1/163* (2013.01); *G02B 27/017* (2013.01); *G02B 27/0176* (2013.01);
  (Continued)

(58) Field of Classification Search
  CPC ...... G06F 1/163; G06F 1/1694; G06F 1/1688; G06F 1/1637; G06F 3/011; G02B 27/017;
  (Continued)

(56) References Cited

U.S. PATENT DOCUMENTS

| 6,736,759 B1 * | 5/2004 | Stubbs | A63B 22/00 |
|---|---|---|---|
| | | | 482/8 |
| 8,109,629 B2 * | 2/2012 | Howell | G02C 5/143 |
| | | | 351/158 |

(Continued)

FOREIGN PATENT DOCUMENTS

| CN | 1747668 A | 3/2006 |
|---|---|---|
| CN | 101467446 A | 6/2009 |

(Continued)

OTHER PUBLICATIONS

First Chinese Office Action regarding Application No. 201410056754.9 dated May 4, 2016. English translation provided by Unitalen Attorneys at Law.

(Continued)

*Primary Examiner* — Andre L Matthews
(74) *Attorney, Agent, or Firm* — Harness, Dickey & Pierce, P.L.C.

(57) ABSTRACT

A wearable electronic apparatus includes: a fixing unit configured to maintain a relative position relationship between the wearable electronic apparatus and the user's head, the fixing unit can maintain a first relative position relationship and a second relative position relationship between the wearable electronic apparatus and the user's head, and the first relative position relationship is different from the second relative position relationship; a display unit, fixed provided on the fixing unit; a first sound output unit, located at a first end of the fixing unit; a second sound output unit, located at a second end of the fixing unit, and the first end is different from the second end. With the present invention, using the wearable electronic apparatus to facilitate processing information, at least the problem that user's combined experiences of functional requirements, entertain- (Continued)

ment requirements and usability requirements etc. are met is solved.

1 Claim, 8 Drawing Sheets

(52) U.S. Cl.
CPC .......... *G06F 1/1637* (2013.01); *G06F 1/1688* (2013.01); *G06F 1/1694* (2013.01); *G06F 3/011* (2013.01); *G02B 2027/014* (2013.01); *G06F 2200/1637* (2013.01)

(58) Field of Classification Search
CPC .......... G02B 27/0176; G02B 2027/014; G02B 2200/1637
See application file for complete search history.

(56) References Cited

U.S. PATENT DOCUMENTS

| | | | |
|---|---|---|---|
| 8,362,972 B2 | 1/2013 | Miyakawa et al. | |
| 8,482,909 B2 | 7/2013 | Douglas | |
| 8,643,568 B2 | 2/2014 | West et al. | |
| 8,732,864 B2 | 5/2014 | Fountain et al. | |
| D736,771 S | 8/2015 | West et al. | |
| 2002/0044152 A1* | 4/2002 | Abbott, III | G06T 11/00 345/629 |
| 2004/0113867 A1 | 6/2004 | Tomine et al. | |
| 2006/0146514 A1 | 7/2006 | Douglas | |
| 2007/0220649 A1 | 9/2007 | Huh | |
| 2009/0073083 A1 | 3/2009 | Miyakawa et al. | |
| 2009/0243966 A1 | 10/2009 | Kato et al. | |
| 2009/0251888 A1 | 10/2009 | Douglas | |
| 2011/0209273 A1 | 9/2011 | Fountain et al. | |
| 2011/0273365 A1 | 11/2011 | West et al. | |
| 2012/0078999 A1 | 3/2012 | Andrew et al. | |
| 2013/0002724 A1 | 1/2013 | Heinrich et al. | |
| 2013/0222270 A1* | 8/2013 | Winkler | H04M 1/0233 345/173 |
| 2013/0231574 A1 | 9/2013 | Tran | |
| 2013/0300636 A1* | 11/2013 | Cunningham | G10L 13/02 345/8 |
| 2014/0028546 A1 | 1/2014 | Jeon et al. | |
| 2014/0176398 A1 | 6/2014 | West et al. | |
| 2014/0285520 A1* | 9/2014 | Park | G06T 19/006 345/633 |
| 2015/0003210 A1* | 1/2015 | Joung | G06F 1/163 368/10 |
| 2015/0070251 A1* | 3/2015 | Kim | G06F 1/163 345/8 |
| 2016/0110157 A1 | 4/2016 | Kato et al. | |

FOREIGN PATENT DOCUMENTS

| | | |
|---|---|---|
| CN | 101496400 A | 7/2009 |
| CN | 102118470 A | 7/2011 |
| CN | 102281842 A | 12/2011 |
| CN | 202502301 U | 10/2012 |
| CN | 102918443 A | 2/2013 |
| CN | 202735594 U | 2/2013 |
| CN | 103119920 A | 5/2013 |
| CN | 103581428 A | 2/2014 |
| CN | 203720703 U | 7/2014 |
| JP | 2006148405 A | 6/2006 |

OTHER PUBLICATIONS

First Chinese Office Action regarding Application No. 201310452973.4 dated Apr. 25, 2017. English translation.
Second Chinese Office Action regarding Application No. 201410056754.9 dated Nov. 30, 2016. English translation provided by Unitalen Attorneys at Law.

* cited by examiner

ELECTRONIC APPARATUS AND METHOD FOR PROCESSING INFORMATION

CROSS-REFERENCES TO RELATED APPLICATIONS

This application claims priority to Chinese Patent Application No. 201310452973.4, entitled "WEARABLE ELECTRONIC APPARATUS AND METHOD FOR PROCESSING INFORMATION", filed with the Chinese State Intellectual Property Office on Sep. 27, 2013, and priority to Chinese Patent Application No. 201410056754.9, entitled "ELECTRONIC APPARATUS AND METHOD FOR PROCESSING INFORMATION", filed with the Chinese State Intellectual Property Office on Feb. 19, 2014, which are incorporated herein by reference in their entireties.

TECHNICAL FIELD

The present invention relates to information processing technology, and particularly, to an electronic apparatus and a method for processing information.

BACKGROUND

With the development of smart electronic apparatus, many kinds of portable electronic apparatus such as smart watch, smart glasses, smart phone etc. have been widely used by users. When a user demands for all the portable electronic apparatus mentioned above, he will spend much money to buy them. However, various portable electronic apparatus have overlapping functions, and when a user carries many kinds of portable electronic apparatus with him, it is more trouble for him to use the portable device due to the poor association among the many kinds of portable electronic apparatus, for example, when a call is coming, the smart phone will ring, and the smart watch and the smart glasses will remind the user simultaneously, so the user is required to operate the three portable electronic apparatus, resulting in inconvenience.

SUMMARY

In view of the above, a main object of the present invention is to provide an electronic apparatus and a method for processing information, and using the electronic apparatus to facilitate processing information, at least the problem that user's combined experiences of functional requirements, entertainment requirements and usability requirements etc. are met is solved.

An electronic apparatus, including:
a fixing unit, configured to maintain a relative position relationship between the electronic apparatus and a user's head or wrist; where the fixing unit is configured to maintain a first relative position relationship with the user's wrist; the fixing unit is configured to maintain a second relative position relationship with the user's head; and
a display unit, fixedly provided on the fixing unit;
herein,
the electronic apparatus is in a first use mode, in the case where the fixing unit maintains the first relative position relationship between the electronic and the user's head; and
the electronic apparatus is in a second use mode, in the case where the fixing unit maintains the second relative position relationship between the electronic apparatus and the user's wrist, and the first use mode is different from the second use mode.

Preferably, the electronic apparatus further includes:
a first sound output unit, located at a first end of the fixing unit; and
a second sound output unit, located at a second end of the fixing unit,
where the first end is different from the second end.

Preferably, in the case where the display unit is located a first position on the fixing unit, light output by the display unit to form a display image is incident on the user's eyes.

Preferably, the first sound output unit is rotatably connected to the fixing unit; the second sound output unit is rotatably connected to the fixing unit, so that the fixing unit maintains the relative position relationship with the user's head, changes the relative position relationship of the fixing unit relative to the user's head, and maintains the relative positions of the first sound output unit and the second sound output unit relative to the user's head.

Preferably, the electronic apparatus further includes a sensing unit;
where the sensing unit is provided at a second location of the fixing unit, the sensing unit is configured to obtain sensing information indicating that the electronic apparatus contacts the user's nose bridge, the sensing information is configured to initiate the display unit.

Preferably, the electronic apparatus further includes a gravity sensor
where the display unit is initiated in the case where the gravity sensor determines that the fixing unit is switched in position.

Preferably, the display unit is a flexible display screen;
the fixing unit comprises a first member and a second member which are flexible; and
the first member is connected to a first end of the display screen by a first connection member, and the second member is connected to a second end of the display screen by a second connection member.

Preferably, the electronic apparatus further has a third operation state;
where the display screen is in a first state, a second state or a third state; the first state, the second state and the third state are different from each other;
in the case where the display screen is in the first state and the first member and the second member maintains the first relative position relationship between the electronic apparatus and the user's wrist, the electronic apparatus is in a first use mode; in the case where the display screen is in the second state and the first member and the second member maintains the second relative position relationship between the electronic apparatus and the user's head, the electronic apparatus is in a second use mode; and
in the case where the display screen is in the third state, the electronic apparatus is in a third use mode.

Preferably, the electronic apparatus further includes a bendable housing, where a groove is provided on a first surface of the housing; and in the case where the electronic apparatus is in the third use mode, the first member and the second member are accommodated within the groove of the housing.

Preferably, the display screen is provided on a second surface of the housing, light output from the display screen to form a display image is incident on the user's eyes in the case where the first member and the second member maintain the second relative position relationship between the electronic apparatus and the user's head; and
the second surface is different from the first surface.

Preferably, the display screen has s first display interface, a second display interface and a third display interface; herein, in the case where the electronic apparatus is in the first use mode, the second use mode or the third use mode, the display screen displays the first multimedia data via the first display interface, the second display interface and the third display interface.

Preferably, the display screen has a first display interface, a second display interface and a third display interface; herein, in the case where the electronic apparatus is in the first use mode, the display screen displays the first multimedia data via the first display interface and the second display interface.

Preferably, the display screen has a first display interface, a second display interface and a third display interface; herein, in the case where the electronic apparatus is in the first use mode, the display screen displays the first multimedia data via the second display interface and the third display interface.

Preferably, the display screen has a first display interface, a second display interface and a third display interface; herein, in the case where the electronic apparatus is in the first use mode, the display screen displays the first multimedia data via the first display interface or the third display interface.

A method for processing information applied to an electronic apparatus, where the electronic apparatus includes a fixing unit and a display unit, the fixing unit is configured to maintain a first relative position relationship between the electronic apparatus and a user's wrist; the fixing unit is configured to maintain a second relative position relationship between the electronic apparatus and the user's head; the display unit is fixedly provided on the fixing unit; the method includes:

obtaining a first trigger instruction for indicating whether to initiate a first use mode of the electronic apparatus;

controlling the electronic apparatus to be in a first operation mode corresponding to the first use mode, in response to the first trigger instruction;

obtaining a second trigger instruction for indicating whether to initiate a second use mode of the electronic apparatus;

controlling the electronic apparatus to be in a second operation mode corresponding to the second use mode, in response to the second trigger instruction; wherein the first operation mode is different from the second operation mode;

herein, in the case where the electronic apparatus is in the first use mode, the fixing unit maintains the first relative position relationship with the user's wrist;

in the case where the electronic apparatus is in the second use mode, the fixing unit maintains the second relative position relationship with the user's head; the first use mode is different from the second use mode.

Preferably, the electronic apparatus further includes a gravity sensor where the gravity sensor issues the first trigger instruction in the case where the gravity sensor satisfies a first preset parameter value;

the step of controlling the electronic apparatus to be in a first operation mode corresponding to the first use mode, in response to the first trigger instruction includes:

determining that the fixing unit is located at the first relative position based on the first preset parameter value, initiating the first sound output unit and/or the second sound output unit, controlling the electronic apparatus to be in a sound output mode, and performing a call operation mode between a electronic terminal corresponding to the sound output mode;

issuing the second trigger instruction in the case where the gravity sensor satisfies a second preset parameter value;

the step of controlling the electronic apparatus to be in a second operation mode corresponding to the second use mode, in response to the second trigger instruction, includes:

determining that the fixing unit is switched to the second relative position from the first relative position based on the second preset parameter value, initiating the display unit, controlling the electronic apparatus to be in a display and sound output mode, and performing a glasses operation mode of the electronic apparatus corresponding to the display and sound output mode.

Preferably, the electronic apparatus further includes a sensing unit provided at a second position on the fixing unit;

where the sensing unit is configured to issue the first trigger instruction in the case where the sensing unit senses that the fixing unit maintains the first relative position relationship with the user's head of the electronic apparatus;

the step of, controlling the electronic apparatus to be in a first operation mode corresponding to the first use mode, in response to the first trigger instruction, includes:

obtaining, by the sensing unit, sensing information indicating that the electronic apparatus contacts the user's head in the case where the fixing unit maintains the first relative position relationship with the user's head of the electronic apparatus; wherein the sensing information is configured to initiate the first sound output unit and/or the second sound output unit, control the electronic apparatus to be in a sound output mode and perform a call operation mode between electronic terminals corresponding to the sound output mode;

where the sensing unit is configured to issue the second trigger instruction in the case where the sensing unit senses that the fixing unit maintains the second relative position relationship with the user's head of the electronic apparatus;

the step of controlling the electronic apparatus to be in a second operation mode corresponding to the second use mode, in response to the second trigger instruction, includes:

obtaining, by the sensing unit, sensing information indicating that the electronic apparatus contacts the user's nose bridge in the case where the fixing unit maintains the second relative position relationship with the user's head of the electronic apparatus; wherein the sensing information is configured to initiate the display unit, control the electronic apparatus to be in a display and sound output mode, and perform a glasses operation mode of the electronic apparatus corresponding to the display and sound output mode.

In the method for processing information of the present invention, the electronic apparatus is supported to facilitate processing information, which can make the user's two hands free and will not affect user's current information processing operation, therefore at least solving the problem that user's combined experiences of functional requirements, entertainment requirements and usability requirements etc. are met.

DETAILED DESCRIPTION

According to the embodiments of the present invention, it is provided an electronic apparatus, which includes:

a fixing unit, configured to maintain a relative position relationship between the electronic apparatus and a user's head or wrist; the fixing unit is configured to maintain a first relative position relationship between the electronic apparatus and the user's wrist; the fixing unit is configured to maintain a second relative position relationship between the electronic apparatus and the user's head; and a display unit, fixedly disposed on the fixing unit; where, the electronic apparatus is in a first use mode, in the case where the fixing unit maintains the first relative position relationship between the electronic apparatus and the user's head; and the electronic apparatus is in a second use mode, in the case where the fixing unit maintains the second relative position relationship between the electronic apparatus and the user's wrist, and the first use mode is different from the second use mode.

Implementations of the technical solutions will be further described in detail below with reference to the accompanying drawings.

Embodiment 1

In the present embodiment, the electronic apparatus may be a wearable electronic apparatus, herein, various components in the wearable electronic apparatus may be designed integrally, that is, the various components cannot be rotated/detached from each other and cannot be reassembled, and they are in a completely fixed connection.

Figure 1:
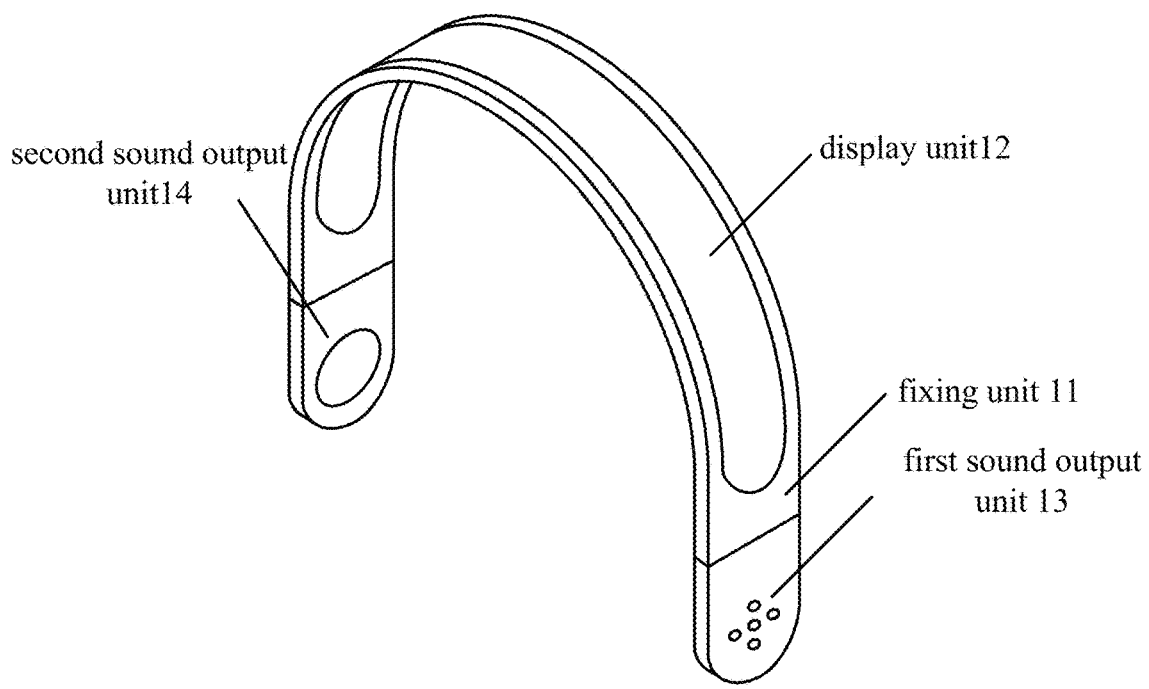
FIG. 1 is a schematic diagram of a construction of an electronic apparatus according to an embodiment of the present invention.

FIG. 1 shows a wearable electronic apparatus of the embodiment of the present invention which includes:

a fixing unit 11, configured to maintain a relative position relationship between the wearable electronic apparatus and a user's head; the fixing unit 11 is able to maintain a first relative position relationship and a second relative position relationship between the wearable electronic apparatus and the user's head, and the first relative position relationship is different from the second relative position relationship;

a display unit 12, fixedly disposed on the fixing unit 11;

a first sound output unit 13, located at a first end of the fixing unit 11;

a second sound output unit 14, located at a second end of the fixing unit 11, and the first end is different from the second end, herein:

the wearable electronic apparatus is in a first use mode, in the case where the fixing unit 11 maintains the first relative position relationship between the wearable electronic apparatus and the user's head; and the wearable electronic apparatus is in a second use mode, in the case where the fixing unit 11 maintains the second relative position relationship between the wearable electronic apparatus and the user's head.

In the present embodiment, preferably, the various components in the wearable electronic apparatus may be designed integrally, that is, the various components cannot be rotated/detached from each other and cannot be reassembled in an arbitrary manner.

At this point, due to the integrally designed wearable electronic apparatus, the fixed connection between the fixing unit and the first sound output unit and/or the second sound output unit cannot be adjusted/rotated. Thus, when the first relative position relationship and the second relative position relationship is switched therebetween, the only thing that can do is to put on or take off the wearable electronic apparatus. For example, in the case where the fixing unit maintains the first relative position relationship between the wearable electronic apparatus and the user's head, the wearable electronic apparatus is put on the user's head to function as a headset, and the corresponding first use mode is that the user of the wearable electronic apparatus listens to the sound output from the wearable electronic apparatus. As another example, in the case where the fixing unit maintains the second relative position relationship between the wearable electronic apparatus and the user's head, the wearable electronic apparatus is taken off from the head and is mounted above the eyes to function as glasses by using the display unit on the fixing unit, and the corresponding second use mode is that the user of the wearable electronic apparatus watches such as image and video output from the wearable electronic apparatus.

In the case where the relative position relationship between the wearable electronic apparatus and the user's head maintained by the fixing unit is switched from the first relative position relationship to the second relative position relationship, positions of the first sound output unit at the first end of the fixing unit and the second sound output unit at the second end of the fixing unit relative to the user's head of the wearable electronic apparatus are maintained to be approximately constant, that is, both around the ears, respectively.

Using the wearable electronic apparatus of the present invention, with the change between the first relative position relationship and the second relative position relationship, the use mode is switched between the first use mode and the second use mode and thus a corresponding first operating mode or a corresponding second operating mode is performed, which will make the user's hands free, will not affect the user's current information processing operation and will meet the user's combined experiences of functional requirements, entertainment requirements and usability requirements etc.

Embodiment 2

Various components of the wearable electronic apparatus is not integrally designed, that is, the various components are not fixedly connected to each other, can be rotated/detached from each other and reassembled in an arbitrary manner.

FIG. 1 shows a wearable electronic apparatus of the embodiment of the present invention which includes:

a fixing unit 11, configured to maintain a relative position relationship between the wearable electronic apparatus and a user's head; the fixing unit 11 is able to maintain a first relative position relationship and a second relative position relationship between the wearable electronic apparatus and the user's head, and the first relative position relationship is different from the second relative position relationship;

a display unit 12, fixedly disposed on the fixing unit 11;

a first sound output unit 13, located at a first end of the fixing unit 11;

a second sound output unit 14, located at a second end of the fixing unit 11, and the first end is different from the second end, herein:

the wearable electronic apparatus is in a first use mode, in the case where the fixing unit 11 maintains the first relative position relationship between the wearable electronic apparatus and the user's head; and the wearable electronic apparatus is in a second use mode, in the case where the fixing unit 11 maintains the second relative position relationship between the wearable electronic apparatus and the user's head.

In the present embodiment, preferably, the various components of the wearable electronic apparatus are not designed integrally, that is, the various components can be rotated/detached from each other and can be reassembled in an arbitrary manner, i.e. the first sound output unit and the fixing unit are rotatably connected to each other and the second sound output unit and the fixing unit are rotatably connected to each other, so that when the relative position relationship between the wearable electronic apparatus and the user's head to be switched from the first relative position relationship to the second relative position relationship, the position of the fixing unit relative to the user's head is changed and the relative positions between user's head and the first, and between the user's head and the second sound output units are maintained constant. The present embodiment is different from the completely fixed manner of Embodiment 1.

At this point, due to the non-integrally designed wearable electronic apparatus, when the first relative position relationship and the second relative position relationship is switched therebetween, it is not required to put on or take off the wearable electronic apparatus. In the case where the fixing unit maintains the first relative position relationship between the wearable electronic apparatus and the user's head, the wearable electronic apparatus is put on the user's head to function as a headset, and the corresponding first use mode is that the user of the wearable electronic apparatus listens to the sound output from the wearable electronic apparatus. As another example, in the case where the fixing unit maintains the second relative position relationship between the wearable electronic apparatus and the user's head, due to the non-integrally designed wearable electronic apparatus, the connection between the fixing unit and the first sound output unit and/or the second sound output unit is a non-fixed connection which can be adjusted/rotated, and it is not required to take off the wearable electronic apparatus from the head. With this non-fixed connection, the fixing unit is mounted above the eyes to function as glasses by using the display unit on the fixing unit, and the corresponding second use mode is that the user observes such as image and video output from the wearable electronic apparatus. In the case where it is required to return to the first use mode, the modes can be switched therebetween repeatedly by this on-fixed connection.

In the case where the relative position relationship between the wearable electronic apparatus and the user's head maintained by the fixing unit is switched from the first relative position relationship to the second relative position relationship, positions of the first sound output unit at the first end of the fixing unit and the second sound output unit at the second end of the fixing unit relative to the user's head of the wearable electronic apparatus are maintained to be approximately constant, that is, both around the ears, respectively.

Using the wearable electronic apparatus of the present invention, with the change between the first relative position relationship and the second relative position relationship, the use mode is switched between the first use mode and the second use mode and thus a corresponding first operating mode or a corresponding second operating mode is performed, and by this non-fixed connection, the modes can be switched therebetween randomly, which will make the user's hands free, will not affect the user's current information processing operation and will meet the user's combined experiences of functional requirements, entertainment requirements and usability requirements etc.

Embodiment 3

The display is an ordinary display.

FIG. 1 shows a wearable electronic apparatus of the embodiment of the present invention which includes:

a fixing unit 11, configured to maintain a relative position relationship between the wearable electronic apparatus and a user's head; the fixing unit 11 is able to maintain a first relative position relationship and a second relative position relationship between the wearable electronic apparatus and the user's head, and the first relative position relationship is different from the second relative position relationship;

a display unit 12, fixedly disposed on the fixing unit 11;

a first sound output unit 13, located at a first end of the fixing unit 11;

a second sound output unit 14, located at a second end of the fixing unit 11, and the first end is different from the second end, herein:

the wearable electronic apparatus is in a first use mode, in the case where the fixing unit 11 maintains the first relative position relationship between the wearable electronic apparatus and the user's head; and the wearable electronic apparatus is in a second use mode, in the case where the fixing unit 11 maintains the second relative position relationship between the wearable electronic apparatus and the user's head.

In the present embodiment, preferably, the display unit is located at a first position on the fixing unit so that light output from the display unit to form a display image is incident on eyes of the user in the case where the fixing unit maintains the second relative position relationship between the wearable electronic apparatus and the user's head.

In the present embodiment, the display unit may be implemented as an ordinary display unit, such as a display, that is, the display unit is particularly a display. In this case, only a predefined virtual image can be displayed. For example, the display may be a LCD or LED screen.

Using the wearable electronic apparatus of the present invention, a predefined virtual image conforming to the user demand can be seen so that in addition to making the user's hands free, the user's experience can be increased and the user's combined experiences of functional requirements, entertainment requirements and usability requirements etc can be better met.

Embodiment 4

The display unit is a transparent display unit.

FIG. 1 shows a wearable electronic apparatus of the embodiment of the present invention which includes:

a fixing unit 11, configured to maintain a relative position relationship between the wearable electronic apparatus and a user's head; the fixing unit 11 is able to maintain a first relative position relationship and a second relative position relationship between the wearable electronic apparatus and the user's head, and the first relative position relationship is different from the second relative position relationship;

a display unit 12, fixedly disposed on the fixing unit 11;

a first sound output unit 13, located at a first end of the fixing unit 11;

a second sound output unit 14, located at a second end of the fixing unit 11, and the first end is different from the second end, herein:

the wearable electronic apparatus is in a first use mode, in the case where the fixing unit 11 maintains the first relative position relationship between the wearable electronic apparatus and the user's head; and the wearable electronic apparatus is in a second use mode, in the case where the fixing unit 11 maintains the second relative position relationship between the wearable electronic apparatus and the user's head.

In the present embodiment, preferably, the display unit is located at a first position on the fixing unit so that light output from the display unit to form a display image is incident on eyes of the user in the case where the fixing unit maintains the second relative position relationship between the wearable electronic apparatus and the user's head.

In the present embodiment, the display unit may be implemented to be able to adjust transparency, that is, the display unit is particularly a transparent display unit. In the case where the transparency is higher than a threshold, both a virtual image and a real physical world can be seen. Using the embodiment of the present invention, an overlay effect can be produced. For example, when seeing a building in the front, information such as the longitude and latitude information of the building or what companies working in the building may be captured to be a virtual image which will be superimposed on the building; alternatively, a selection may be made, that is, in the case where the transparency is higher, more transparent, using the embodiment of the present invention, an effect of not shading eyes may be produced so that the user can see the real physical world, for example, looking at where he is going or looking at a building in the front; and in the case where the transparency is lower, more opaque, using the embodiment of the present invention, an effect of shading eyes may be produced so that the user may see a virtual image, such as a map navigation image.

Using the wearable electronic apparatus of the present invention, with different manners the display unit outputs the image, the user may select to observe a single virtual image, a single real physical world or observe a superimposed image formed by combining the virtual image and the real physical world so as to present a user with combination of a simple physical image and information associated with it so that in addition to making the user's hands free, the user's experience can be increased and the user's combined experiences of functional requirements, entertainment requirements and usability requirements etc can be better met.

Embodiment 5

In the present embodiment, the display unit is located at a first position on the fixing unit so that light output from the display unit to form a display image is incident on eyes of the user in the case where the fixing unit maintains the second relative position relationship between the wearable electronic apparatus and the user's head.

In the present embodiment, in the case where the display unit is an ordinary display, a projecting manner may be used and the display is located in front of the user's eyes to function as blocking the user's eyes. A button switch may be provided on the display to control the display to turn on or turn off. A projecting device for performing the projecting manner is provided at the first position to project an image to be displayed onto the user's eyes.

Embodiment 6

In the present embodiment, in the case where the display unit is a transparent display unit, it is considered as a visual component. As a portion of a display system, different from Embodiment 5, the display unit of the present embodiment is not provided in front of the user's eyes and does not function as blocking the user's eyes. Although the projecting manner is used, the projecting device is provided at a position rather the first position in Embodiment 5 mentioned above. For example, a mirror may be used to reflect light: one mirror may be provided where the glasses legs bend and another mirror may be further provided on the glasses frame so that light can be reflected two times to be incident on the user's eyes; as another example, a optical fiber is used: one mirror is provide at the output end of the optical fiber and another mirror is provided in front of the glasses, in which case light is only reflected on time to be incident on the user's eyes, for example the mirror is provided at the first position, which will not prevent the user's eyes from looking at the real physical world.

Embodiment 7

The wearable electronic apparatus further includes a sensing unit.

FIG. 1 shows a wearable electronic apparatus of the embodiment of the present invention which includes:

a fixing unit 11, configured to maintain a relative position relationship between the wearable electronic apparatus and a user's head; the fixing unit 11 is able to maintain a first relative position relationship and a second relative position relationship between the wearable electronic apparatus and the user's head, and the first relative position relationship is different from the second relative position relationship;

a display unit 12, fixedly disposed on the fixing unit 11;

a first sound output unit 13, located at a first end of the fixing unit 11;

a second sound output unit 14, located at a second end of the fixing unit 11, and the first end is different from the second end, herein:

the wearable electronic apparatus is in a first use mode, in the case where the fixing unit 11 maintains the first relative position relationship between the wearable electronic apparatus and the user's head; and the wearable electronic apparatus is in a second use mode, in the case where the fixing unit 11 maintains the second relative position relationship between the wearable electronic apparatus and the user's head.

In the present embodiment, the wearable electronic apparatus further includes a sensing unit which is disposed at a second position on the fixing unit. The sensing unit is used to obtain sensing information charactering that the wearable electronic apparatus contacts the user's nose bridge in the case where the fixing unit maintains the second relative position relationship between the wearable electronic apparatus and the user's head, and the sensing information is used to initiate the display unit.

The present embodiment is applicable to both the electronic apparatus of the fixed connection according to Embodiment 1 and the electronic apparatus of the non-fixed connection according to Embodiment 2.

In the present embodiment, the sensing unit may be implemented to be directly sensing (contact sensing). For example, in the case where the wearable electronic apparatus is directly taken off to be in glasses mode, the glasses are mounted on the nose bridge and contact the nose bridge and thus the sensing information is directly sensed. The sending information is used to initiate the display unit.

In the present embodiment, the sensing unit may be implemented by a pressure sensor (a switch button is provided at the contacting position). For example, in the case where the wearable electronic apparatus is directly taken off to be in glasses mode, the glasses are mounted on the nose bridge and the button is presses so that the display unit is initiated; when the glasses are removed from the nose bridge, the button is released.

Using the embodiment of the present invention, modes are switched therebetween by the sensing unit and the switching manner switching is novel so that in addition to making the user's hands free, the user's experience can be increased and the user's combined experiences of functional requirements, entertainment requirements and usability requirements etc can be better met.

Embodiment 8

The wearable electronic apparatus further includes a gravity sensor.

FIG. 1 shows a wearable electronic apparatus of the embodiment of the present invention which includes:

a fixing unit 11, configured to maintain a relative position relationship between the wearable electronic apparatus and a user's head; the fixing unit 11 is able to maintain a first relative position relationship and a second relative position relationship between the wearable electronic apparatus and the user's head, and the first relative position relationship is different from the second relative position relationship;

a display unit 12, fixedly disposed on the fixing unit 11;

a first sound output unit 13, located at a first end of the fixing unit 11;

a second sound output unit 14, located at a second end of the fixing unit 11, and the first end is different from the second end, herein:

the wearable electronic apparatus is in a first use mode, in the case where the fixing unit 11 maintains the first relative position relationship between the wearable electronic apparatus and the user's head; and the wearable electronic apparatus is in a second use mode, in the case where the fixing unit 11 maintains the second relative position relationship between the wearable electronic apparatus and the user's head.

In the present embodiment, the electronic apparatus further includes a gravity sensor and in the case where the gravity sensor determines that the fixing unit is switched from the first relative position relationship to the second relative position relationship, the display unit is initiated.

The present embodiment is applicable to both the electronic apparatus of the fixed connection according to Embodiment 1 and the electronic apparatus of the non-fixed connection according to Embodiment 2.

Using the embodiment of the present invention, modes are switched therebetween by the gravity sensor and the switching is sensitive so that in addition to making the user's hands free, the user's experience can be increased and the user's combined experiences of functional requirements, entertainment requirements and usability requirements etc can be better met.

Herein, as for the electronic apparatus according to Embodiment 1 to Embodiment 8, the related first use mode is a sound output mode and the second use mode is a display and sound output mode.

Herein, it should be noted that the advantageous effects of the following methods are the same as those of the electronic apparatus mentioned above, and so will be omitted. Details which are not disclosed in embodiments of the methods according to the present invention may be referred to the descriptions of the embodiments of the electronic apparatus of the present invention.

Embodiment 9

Figure 2:
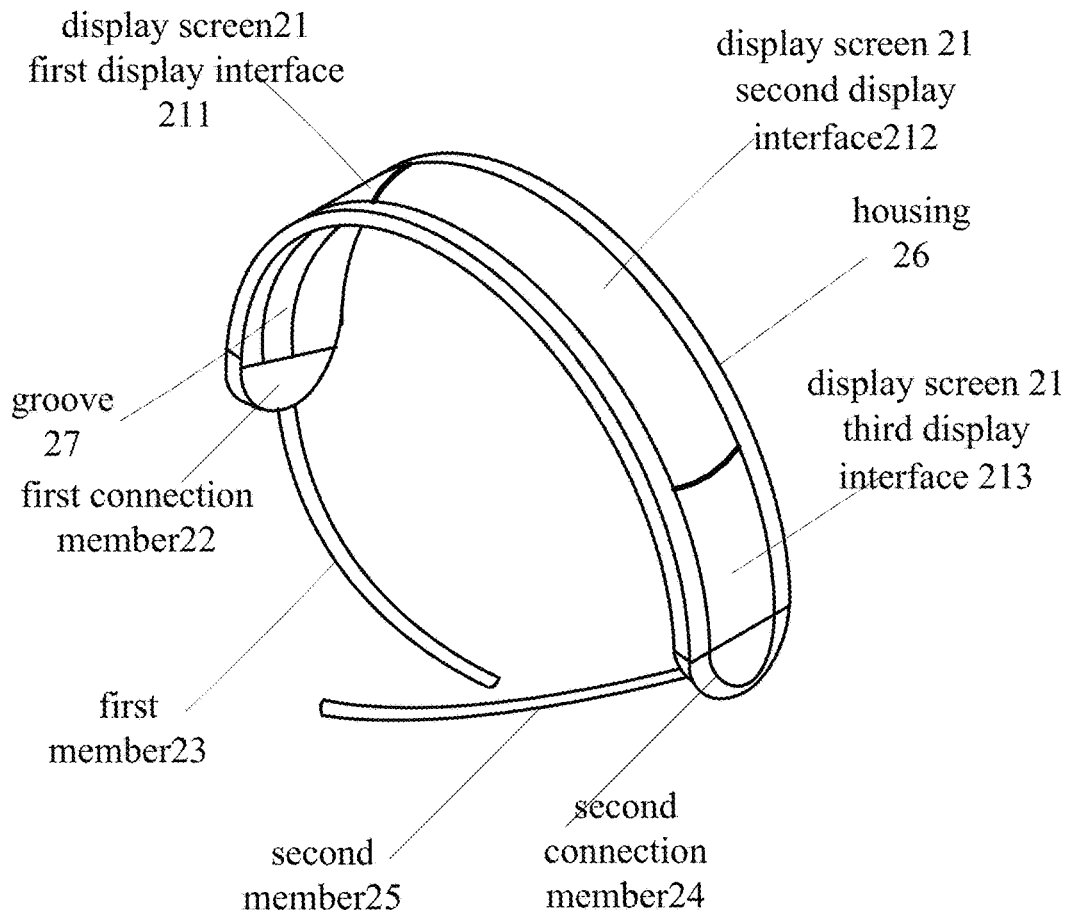
FIG. 2 is a schematic diagram of a construction of an electronic apparatus according to an embodiment of the present invention.

FIG. 2 is a schematic diagram of a construction of an electronic apparatus according to embodiments of the present invention. As shown in FIG. 2, the electronic apparatus includes a flexible display screen 21, a first member 23 connected to a first end of the display screen 21 by a first connection member 22, a second member 25 connected to a second end of the display screen 21 by a second connection member 24, and the first member 23 and the second member 25 are flexible;

The display screen 21 can be in a first state, a second state or a third state; the first state, the second state and the third state are all different from each other;

The first member 23 and the second member 25 are used to maintain relative position relationships between the electronic apparatus and the user's wrist or head; the first member 23 and the second member 25 can maintain a first relative position relationship between the electronic apparatus and the user's wrist; the first member 23 and the second member 25 can maintain a second relative position relationship between the electronic apparatus and the user's head; the first relative position relationship is different from the second relative position relationship; herein, in the case where the display screen 21 is in the first state and the first member 23 and the second member 25 maintain the first relative position relationship between the electronic apparatus and the user's wrist, the electronic apparatus is in a first use mode;

in the case where the display screen 21 is in the second state and the first member 23 and the second member 25 maintain the second relative position relationship between the electronic apparatus and the user's head, the electronic apparatus is in a second use mode;

in the case where the display screen 21 is in the third state, the electronic apparatus is in a third use mode; and the first use mode, the second use mode and the third use mode are all different from each other.

In the present embodiment, the first connection member 22 may be an elastic component such as an elastic sheet, or a rotating shaft.

In the present embodiment, the first member 23 is made of flexible material such as memory plastic. The first member 23 is connected to the first end of the display screen 21 by the first connection member 22. Herein, the display screens 21 is generally of a rectangular shape, and when the upside of the display screen 21 is taken as a basis, the display screen 21 has two ends, one end is the first end and the other end is the second end.

In the embodiment of the present invention, the second connection member 24 may be an elastic component such as an elastic sheet, or a rotating shaft.

In the embodiment of the present invention, the second member 25 is made of flexible material such as memory plastic and the second member 25 is connected to the second end of the display screen 21 by the second connection member 24. Generally, the first connection member 22 and the first member 23 are symmetric relative to the second connection member 24 and the second member 25 about the center of the display screen 21.

In the embodiment of the present invention, the display screen 21 of the electronic apparatus is a flexible display screen 21 which may be fabricated with Phosphorescent Organic Light Emitting Diode (PHOLED) technology. The PHOLED may be fabricated to be a flexible panel which has low power consumption and can be directly visible so as to form the flexible display screen 21; the flexible display screen 21 may be a deformable and bendable display device.

In the embodiment of the present invention, in the case where the display screen 21 of the electronic apparatus is bent into the first state, the display screen 21 assumes a radian which matches the radian of the user's wrist of the electronic apparatus. Thus, when the user carries the electronic apparatus by his wrist, the display screen 21 of the electronic apparatus is attached to the user's wrist. Herein, the wrist is generally referred to as the wrist of the hand.

In the embodiment of the present invention, in the case where the display screen 21 of the electronic apparatus is bent into the second state, the display screen 21 assumes a radian which is different from that of the display screen 21 in the first state. Thus, when the user carries the electronic apparatus by his wrist, the display screen 21 of the electronic apparatus is attached to the user's head, and particularly to a portion of his head in front of his eyes.

In the embodiment of the present invention, in the case where the display screen 21 of the electronic apparatus is stretched into the third state, the display screen 21 assumes a planar shape. Thus, when the user may directly hold the electronic apparatus to watch contents displayed on the display screen 21.

In summary, since the display screen 21 of the electronic apparatus is flexible, the display screen 21 may be formed into the first state, the second state or the third state.

In the embodiment of the present invention, the first member 23 and the second member 25 are flexible, so in the case where the first member 23 and the second member 25 are bent into a radian which matches that of the user's wrist of the electronic apparatus, the first member 23 and the second member 25 may fix the display screen 21 in the first state on the user's wrist. At this time, the first member 23 and the second member 25 maintain the first relative position relationship between the electronic apparatus and the user's wrist and the electronic apparatus is in the first use mode. Particularly, the first use mode is a smart watch, and the user may wear the electronic apparatus on his wrist by adjusting bend degrees of the first member 23, the second member 25 and the display screen 21. The user may use the electronic apparatus as a smart watch.

In the embodiment of the present invention, the first member 23 and the second member 25 are flexible, so in the case where the first member 23 and the second member 25 are bent into a radian which matches that of the user's head of the electronic apparatus, the first member 23 and the second member 25 may fix the display screen 21 in the first state on the user's head. At this time, the first member 23 and the second member 25 maintain the second relative position relationship between the electronic apparatus and the user's head and the electronic apparatus is in the second use mode. Particularly, the second use mode is smart glasses, and the user may wear the electronic apparatus on his head, particularly on a portion of his head in front of his eyes, by adjusting bend degrees of the first member 23, the second member 25 and the display screen 21. The user may use the electronic apparatus as smart glasses.

In the embodiment of the present invention, in the case where the display screen 21 is in the third state, the electronic apparatus is in the third use mode. Particularly, the third use mode is a smart phone and the user may hold the electronic apparatus by hand to use the electronic apparatus as a smart phone.

In the embodiment of the present invention, the electronic apparatus further includes a housing 26 capable of being bent; a first surface of the housing 26 is provided with a groove 27, and in the case where the electronic apparatus is in the third use mode, the first member 23 and the second member 25 are accommodated within the groove 27 of the housing 26.

Herein, the housing 26 has two surfaces, a first surface and a second surface, the first surface of the housing 26 is provided with the groove 27, and in the case where the electronic apparatus is in the third use mode, i.e., used as a smart phone, the first member 23 and the second member 25 may be accommodated within the groove 27, so that the electronic apparatus is more attractive. Preferably, the first member 23 and the second member 25 may be slid into the groove 27 of the housing 26 in a sliding manner, and the first member 23 and second member 25 may also be fold into the groove 27 of the housing 26 in a folding manner.

In the embodiment of the present invention, the display screen 21 is provided on the second surface of the housing 26, so that in the case where the first member 23 and the second member 25 maintains the second relative position relationship between the electronic apparatus and the user's head, light output from the display screen 21 to form a display image can be incident on the user's eyes.

Herein, the second surface is different from the first surface.

In an embodiment of the present invention, the display screen 21 has a first display interface 211, a second display interface 212, and a third display screen 213; herein in the case where the electronic apparatus is in the first use mode, the second use mode, or the third use mode, the display screen 21 displays the first multimedia data via the first display interface 211, the second display interface 212, or the third display interface 213.

Particularly, in the case where the electronic apparatus functions as a smart watch, smart glasses, or a smart phone, all the display interfaces of the display screen 21 can display the first multimedia data, and all the display interfaces of the display interface 21 include the first display interface 211, the second display interface 212, and the third display screen 213. In general, the first display interface 211 is a functional display area, and the first display interface 211 may display text messages, chat, music, video and other functional interfaces; the second display interface 212 is a dial display area, and the second display interface 212 may display time, date, electricity, weather, etc.; the third display interface 213 and the first display interface 211 are similar as a functional display area, and the third display interface 213 may display text messages, chat, music, video and other functional interfaces.

In an embodiment of the present invention, the display screen 21 has a first display interface 211, a second display interface 212, and a third display screen 213; herein in the case where the electronic apparatus is in the first use mode, the display screen 21 displays the first multimedia data via the first display interface 211 and the second display interface 212.

Particularly, in the case where the electronic apparatus is used as a smart watch, the first display interface 211 and the second display interface 212 of the display screen 21 may display the first multimedia data. Generally, the first display interface 211 is a functional display area, and the first display interface 211 may display text messages, chat, music, video and other functional interfaces; and the second display interface 212 is a dial display area, and the second display interface 212 may display time, date, electricity, weather, etc.

In an embodiment of the present invention, the display screen 21 has a first display interface 211, a second display interface 212, and a third display interface 213; herein in the case where the electronic apparatus in the first use mode, the display screen 21 uses the second display interface 212 and the third display interface 213 to display the first multimedia data.

Particularly, in the case where the electronic apparatus is used as a smart watch, the second display interface 212 and the third display interface 213 of the display screen 21 may display the first multimedia data. Generally, the second display interface 212 is a functional display area, and the second display interface 212 may display time, date, electricity, weather, etc.; and the third display interface 213 is a functional display area, and the third display interface 213 may display text messages, chat, music, video and other functional interfaces.

In an embodiment of the present invention, the display screen 21 has a first display interface 211, a second display interface 212, and a third display interface 213; herein in the case where the electronic apparatus is in the first use mode, the display screen 21 displays the first multimedia data via the first display interface 211 or the third display interface 213.

Particularly, in the case where the electronic apparatus is used as a smart watch, the first display interface 211 or the third display interface 213 of the display screen 21 may display the first multimedia data. Generally, the first display interface 211 is a functional display area, and the first display interface 211 may text messages, chat, music, video and other functional interfaces; and the third display interface 213 is similar to the first display interface 211 and is also a functional display area, and the third display interface 213 may display text messages, chat, music, video and other functional interfaces.

Example 10

Figure 3:
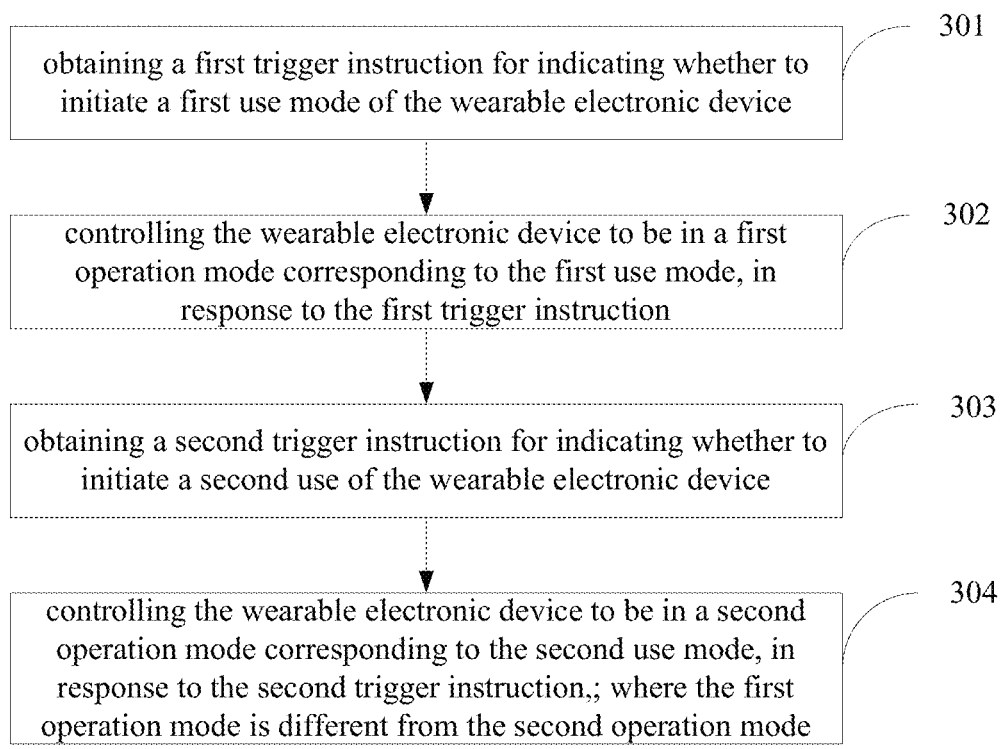
FIG. 3 is a flow chart of an example of a method for processing information according to an embodiment of the present invention.

A method for processing information of the embodiment of the present invention is applied to a wearable electronic apparatus, the wearable electronic apparatus includes a fixing unit, a display unit, a first sound output unit and a second sound output unit; the fixing unit is configured to maintain a relative position relationship between the wearable electronic apparatus and a user's head; the fixing unit is able to maintain a first relative position relationship and a second relative position relationship between the wearable electronic apparatus and the user's head, and the first relative position relationship is different from the second relative position relationship; the display unit is fixedly provided on the fixing unit, the first sound output unit is located at a first end of the fixing unit, the second sound output unit is located at a second end of the fixing unit, and the first end is different from the second end; as shown in FIG. 3, the method including steps 301 to 304.

In step 301, obtaining a first trigger instruction for indicating whether to initiate a first use mode of the wearable electronic apparatus.

In step 302, controlling the wearable electronic apparatus to be in a first operation mode corresponding to the first use mode, in response to the first trigger instruction.

In step 303, obtaining a second trigger instruction for indicating whether to initiate a second use of the wearable electronic apparatus.

In step 304, controlling the wearable electronic apparatus to be in a second operation mode corresponding to the second use mode, in response to the second trigger instruction, where the first operation mode is different from the second operation mode.

Herein, in the case where the wearable electronic apparatus is in the first use mode, the fixing unit maintains the first relative position relationship between the wearable electronic apparatus and the user's head, the wearable electronic apparatus is used as a headset, the corresponding first use mode is that the user of the wearable electronic apparatus listens to the sound output from the wearable electronic apparatus.

in the case where the wearable electronic apparatus is in the second use mode, the fixing unit maintains the second relative position relationship between the wearable electronic apparatus and the user's head, the electronic apparatus is used as glasses, the corresponding second use mode is that the user of the wearable electronic apparatus watches such as image and video output from the wearable electronic apparatus.

The first use mode is different from the second use mode.

Embodiment 11

Figure 4:
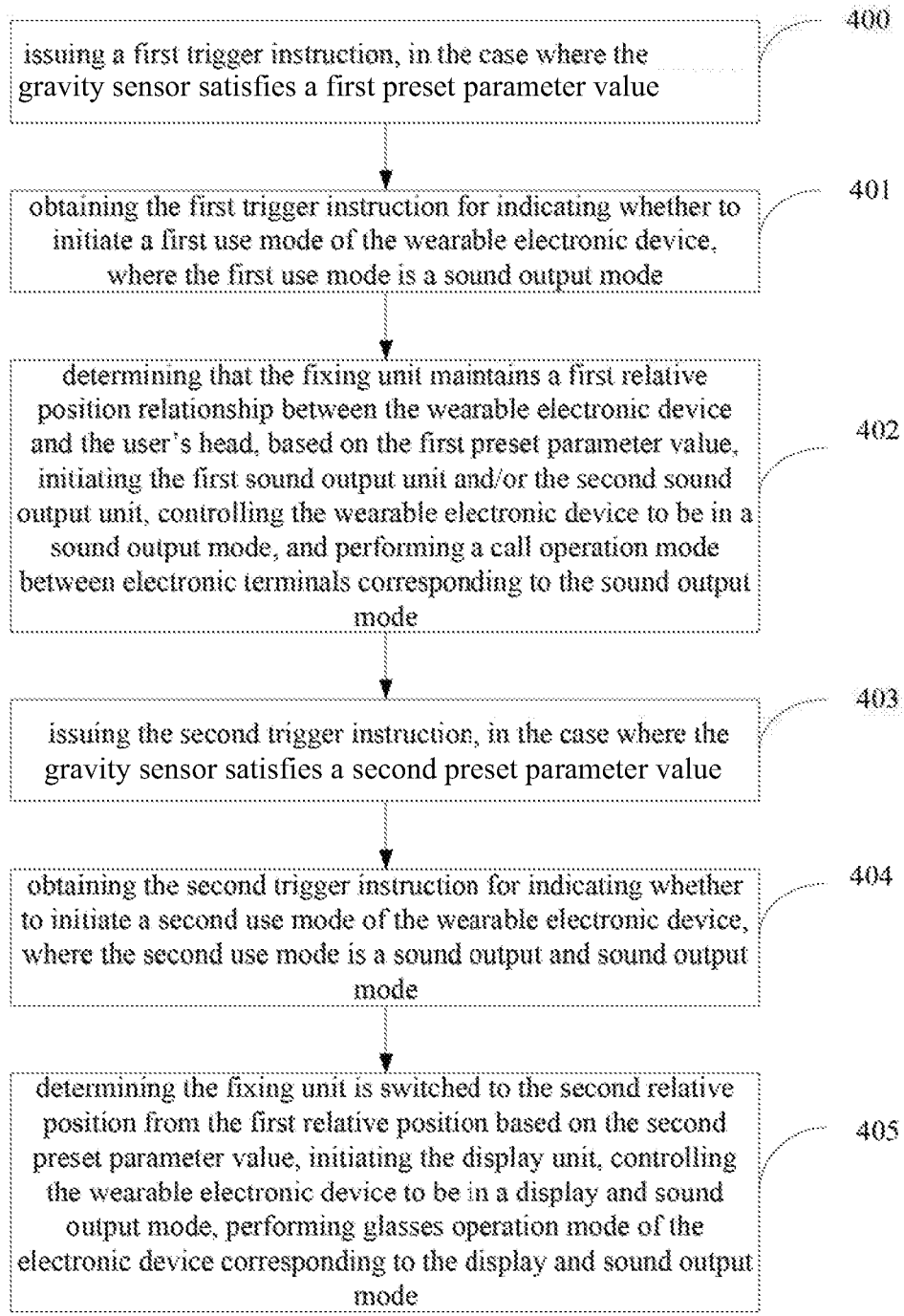
FIG. 4 is a flow chart of an example of a method for processing information according to an embodiment of the present invention.

A method for processing information of the embodiment of the present invention is applied to a wearable electronic apparatus, the wearable electronic apparatus includes a fixing unit, a display unit, a first sound output unit and a second sound output unit; the fixing unit is configured to maintain a relative position relationship between the wearable electronic apparatus and a user's head; the fixing unit is able to maintain a first relative position relationship and a second relative position relationship between the wearable electronic apparatus and the user's head, and the first relative position relationship is different from the second relative position relationship; the display unit is fixedly provided on the fixing unit, the first sound output unit is located at a first end of the fixing unit, the second sound output unit is located at a second end of the fixing unit, and the first end is different from the second end; the wearable electronic apparatus further includes gravity sensor, as shown in FIG. 4, the method including steps 400 to 405.

In step 400, issuing a first trigger instruction, in the case where the gravity sensor satisfies a first preset parameter value.

In step 401, obtaining the first trigger instruction for indicating whether to initiate a first use mode of the wearable electronic apparatus, where the first use mode is a sound output mode.

In step 402, determining that the fixing unit maintains a first relative position relationship between the wearable electronic apparatus and the user's head, based on the first preset parameter value, initiating the first sound output unit and/or the second sound output unit, controlling the wearable electronic apparatus to be in a sound output mode, and performing a call operation mode between electronic terminals corresponding to the sound output mode.

In step 403, issuing the second trigger instruction, in the case where the gravity sensor satisfies a second preset parameter value.

In step 404, obtaining the second trigger instruction for indicating whether to initiate a second use mode of the wearable electronic apparatus, where the second use mode is a sound output and sound output mode.

In step 405, determining the fixing unit is switched to the second relative position from the first relative position based on the second preset parameter value, initiating the display unit, controlling the wearable electronic apparatus to be in a display and sound output mode, performing glasses operation mode of the electronic apparatus corresponding to the display and sound output mode.

Embodiment 12

Figure 5:
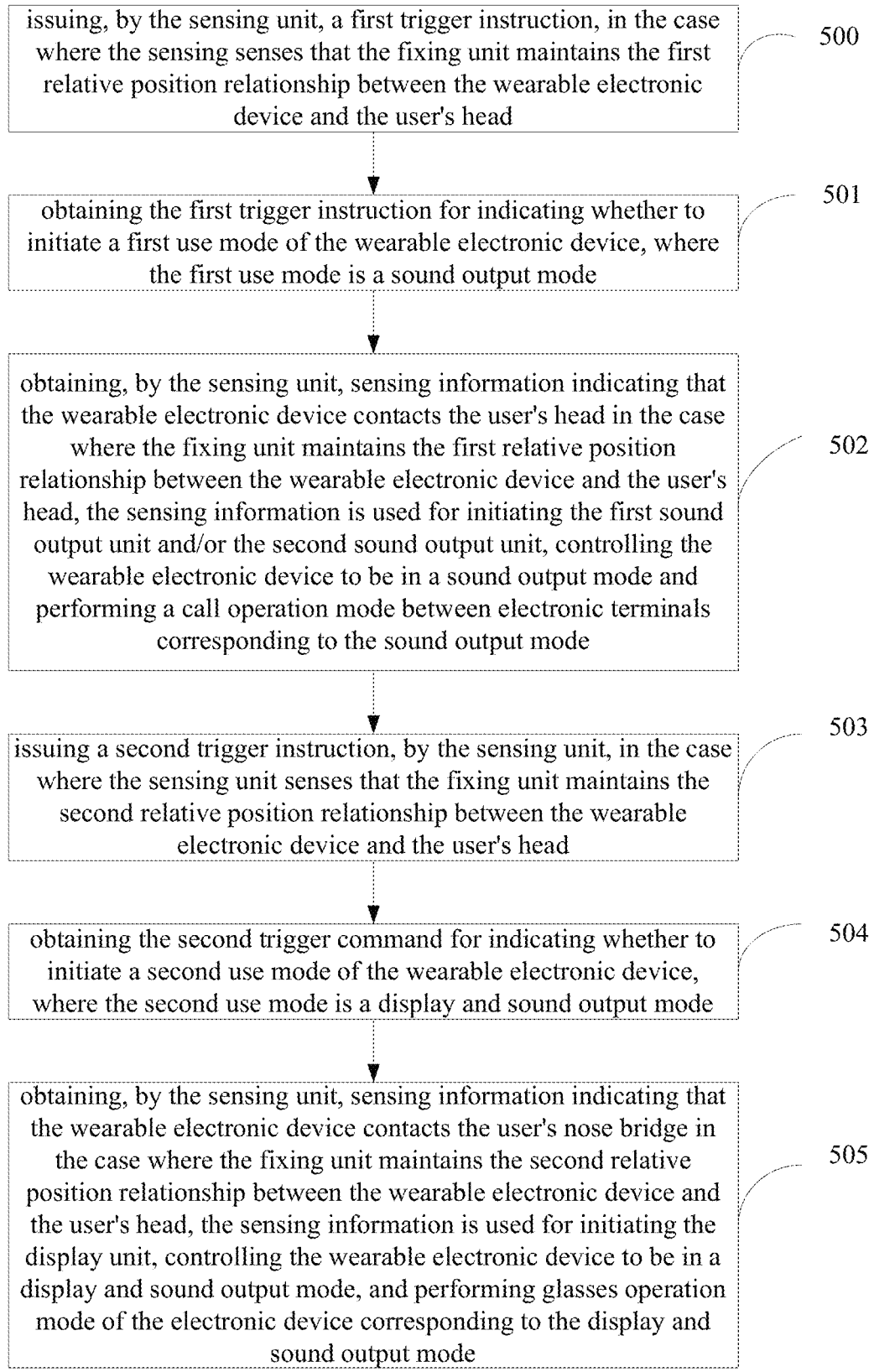
FIG. 5 is a flow chart of an another example of a method for processing information according to an embodiment of the present invention.

A method for processing information of the embodiment of the present invention is applied to a wearable electronic apparatus, the wearable electronic apparatus includes a fixing unit, a display unit, a first sound output unit and a second sound output unit; the fixing unit is configured to maintain a relative position relationship between the wearable electronic apparatus and a user's head; the fixing unit is able to maintain a first relative position relationship and a second relative position relationship between the wearable electronic apparatus and the user's head, and the first relative position relationship is different from the second relative position relationship; the display unit is fixedly provided on the fixing unit, the first sound output unit is located at a first end of the fixing unit, the second sound output unit is located at a second end of the fixing unit, and the first end is different from the second end; the wearable electronic apparatus further includes a sensing unit, and the sensing unit is provided at a second position of the fixing unit; as shown in FIG. 5, the method including steps 500 to 505.

In step 500, issuing, by the sensing unit, a first trigger instruction, in the case where the sensing senses that the fixing unit maintains the first relative position relationship between the wearable electronic apparatus and the user's head.

In step 501, obtaining the first trigger instruction for indicating whether to initiate a first use mode of the wearable electronic apparatus, where the first use mode is a sound output mode.

In step 502, obtaining, by the sensing unit, sensing information indicating that the wearable electronic apparatus contacts the user's head in the case where the fixing unit maintains the first relative position relationship between the wearable electronic apparatus and the user's head, the sensing information is used for initiating the first sound output unit and/or the second sound output unit, controlling the wearable electronic apparatus to be in a sound output mode and performing a call operation mode between electronic terminals corresponding to the sound output mode.

In step 503, issuing a second trigger instruction, by the sensing unit, in the case where the sensing unit senses that the fixing unit maintains the second relative position relationship between the wearable electronic apparatus and the user's head.

In step 504, obtaining the second trigger command for indicating whether to initiate a second use mode of the wearable electronic apparatus, where the second use mode is a display and sound output mode.

In step 505, obtaining, by the sensing unit, sensing information indicating that the wearable electronic apparatus contacts the user's nose bridge in the case where the fixing unit maintains the second relative position relationship between the wearable electronic apparatus and the user's head, the sensing information is used for initiating the display unit, controlling the wearable electronic apparatus to be in a display and sound output mode, and performing glasses operation mode of the electronic apparatus corresponding to the display and sound output mode.

Here, as for embodiments of the method mentioned above, the wearable electronic apparatus is in the sound output mode, and cannot see, so there exists only one way to interact (an interactive mode which can listen to), that is, a voice interactive mode, such as a sound-controlled mode. The wearable electronic apparatus is in the display and sound output mode, can both see and listen to, so there exists a variety of ways to interact (interactive mode which can only listen to or which can only see, or interactive mode which can both listen to and see), such as at least one of gesture, and sound-controlled modes.

Figure 6:
FIG. 6 is a schematic diagram of a use scene according to an embodiment of the present invention.
Figure 7:
FIG. 7 is a schematic diagram of another use scene according to an embodiment of the present invention.
Figure 8:
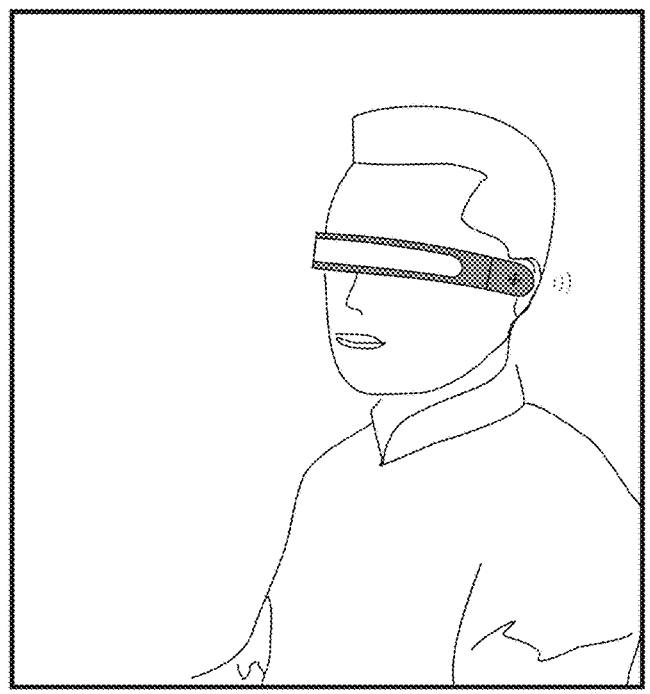
FIG. 8 is a schematic diagram of yet another use scene according to an embodiment of the present invention.

In the following, a specific use scene will be described. FIGS. 6 to 8 show a headset communication device:

Scene A: the wearable electronic apparatus is usually put on head like an earphone, and then the wearable electronic apparatus is determined to be in an earphone mode, and when a call is coming, the first use mode (such as hands-free mode) is automatically initiated, and the user can directly talk, as shown in FIGS. 6 and 7; so that the user can talk when the user is at work or both hands are not convenient.

Scene B: the wearable electronic apparatus can be turned down and put on the eyes, then the wearable electronic apparatus is determined to be switched to the second use mode (such as glasses mode), the user can perform UI interactions through eyes, as shown in FIG. 8; such two modes can be switched between, so as to not only make users more convenient and practical, but also make user's experience very innovative.

Embodiment 13

Figure 9:
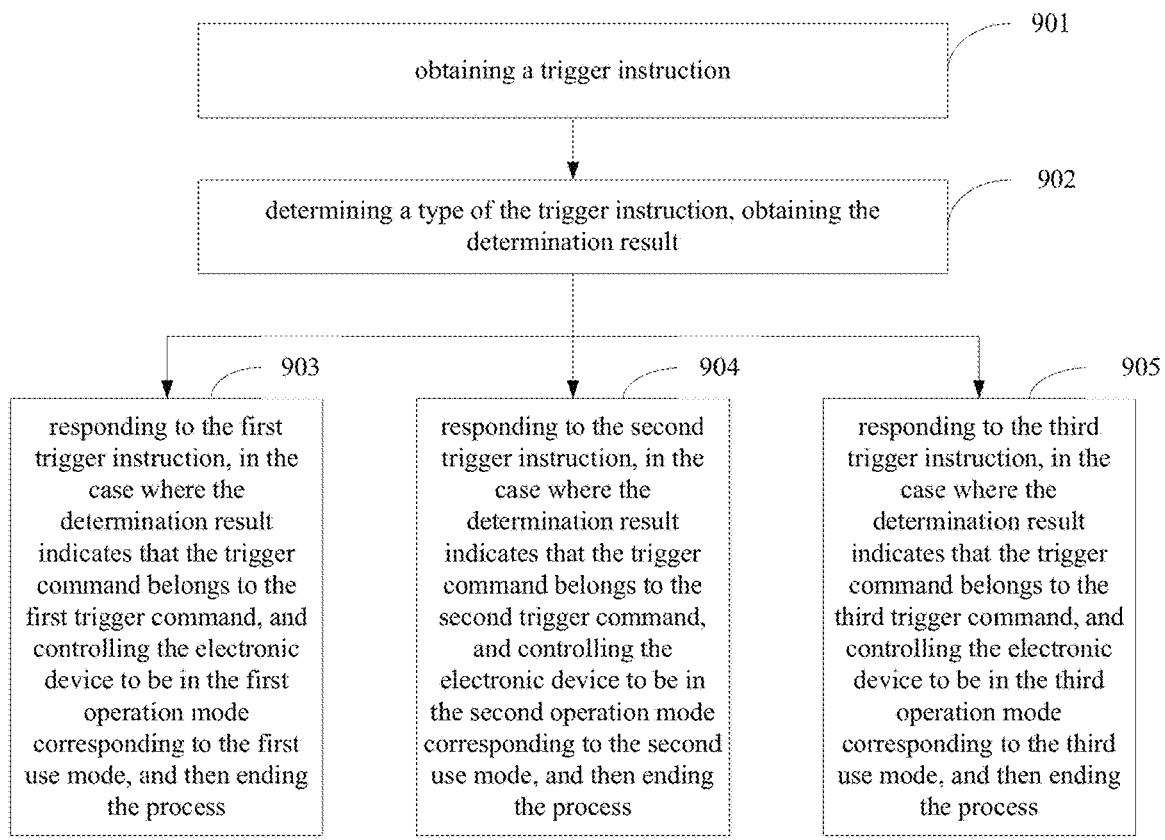
FIG. 9 is a flow chart of an example of a method for processing information according to an embodiment of the present invention.

FIG. 9 is a flow chart of a method for processing information according to Embodiment 13 of the present invention, and the method for processing information of the present embodiment is applied to an electronic apparatus, the electronic apparatus includes a flexible display screen, a first member connected to a first end of the display screen by a first connection member and a second member connected to a second end of the display screen by a second connection member, the first member and the second member are flexible; the display screen can be formed into a first state, a second state or a third state; the first state, the second state and the third state are all different; the first member and the second member are used to maintain a relative position relationship between the electronic apparatus and the user's wrist or head; the first member and the second member can maintain a first relative position relationship between the electronic apparatus and the user's wrist; the first member and the second member can maintain a second relative position relationship between the electronic apparatus and the user's head; the first relative position relationship is different from the second relative position relationship; as shown in FIG. 9, the method for processing information includes steps 901 to 905.

In step 901: obtaining a trigger instruction.

Particularly, a user of the electronic apparatus causes the electronic apparatus to be worn on the user's wrist by adjusting bend degrees of the first member, the second member, and the display screen, the user may use the electronic apparatus as a smart watch, and here, it is required for the electronic apparatus to be switched to a first operation mode. A user of the electronic apparatus causes the electronic apparatus to be worn on the user's head by adjusting bend degrees of the first member, the second member, and the display screen, the user may use the electronic apparatus as smart glasses, and here, it is required for the electronic apparatus to be switched to a second operation mode. A user of the electronic apparatus causes the electronic apparatus to assume a planar shape by adjusting bend degrees of the first member, the second member, and the display screen, the user may use the electronic apparatus as a smart phone, and here, it is required for the electronic apparatus to be switched to a third operation mode.

Based on this, the user can trigger different instructions to enable the electronic apparatus to be switched to a corresponding operation mode.

In step 902: determining a type of the trigger instruction, obtaining the determination result, and proceeding to step 903, step 904 or step 905.

Here, according to types, the trigger instructions can be classified into a first trigger instruction, a second trigger instruction and a third trigger instruction; the first trigger instruction corresponds to the first operation mode, the second trigger instruction corresponds to the second operation mode, and the third trigger instruction corresponds to the third operation mode.

In step 903: responding to the first trigger instruction, in the case where the determination result indicates that the trigger command belongs to the first trigger command, and controlling the electronic apparatus to be in the first operation mode corresponding to the first use mode, and then ending the process.

In step 904: responding to the second trigger instruction, in the case where the determination result indicates that the trigger command belongs to the second trigger command, and controlling the electronic apparatus to be in the second operation mode corresponding to the second use mode, and then ending the process.

In step 905: responding to the third trigger instruction, in the case where the determination result indicates that the trigger command belongs to the third trigger command, and controlling the electronic apparatus to be in the third operation mode corresponding to the third use mode, and then ending the process.

In the embodiment of the present invention, in the case where the electronic apparatus is in the first use mode, the display screen is formed into the first state, and the first member and the second member maintains the first relative position relationship between the electronic apparatus and the user's wrist;

in the case where the electronic apparatus is in the second use mode, the display screen is formed into the second state, and the first member and the second member maintains the second relative position relationship between the electronic apparatus and the user's head;

in the case where the electronic apparatus is in the third use mode, the display screen is formed into the second state.

It should be appreciated by persons skilled in the art that functions that can be implemented by the electronic apparatus in the method for processing information shown in FIG. 9 can be referred to the foregoing related description of the electronic apparatus.

Embodiment 14

Figure 10:
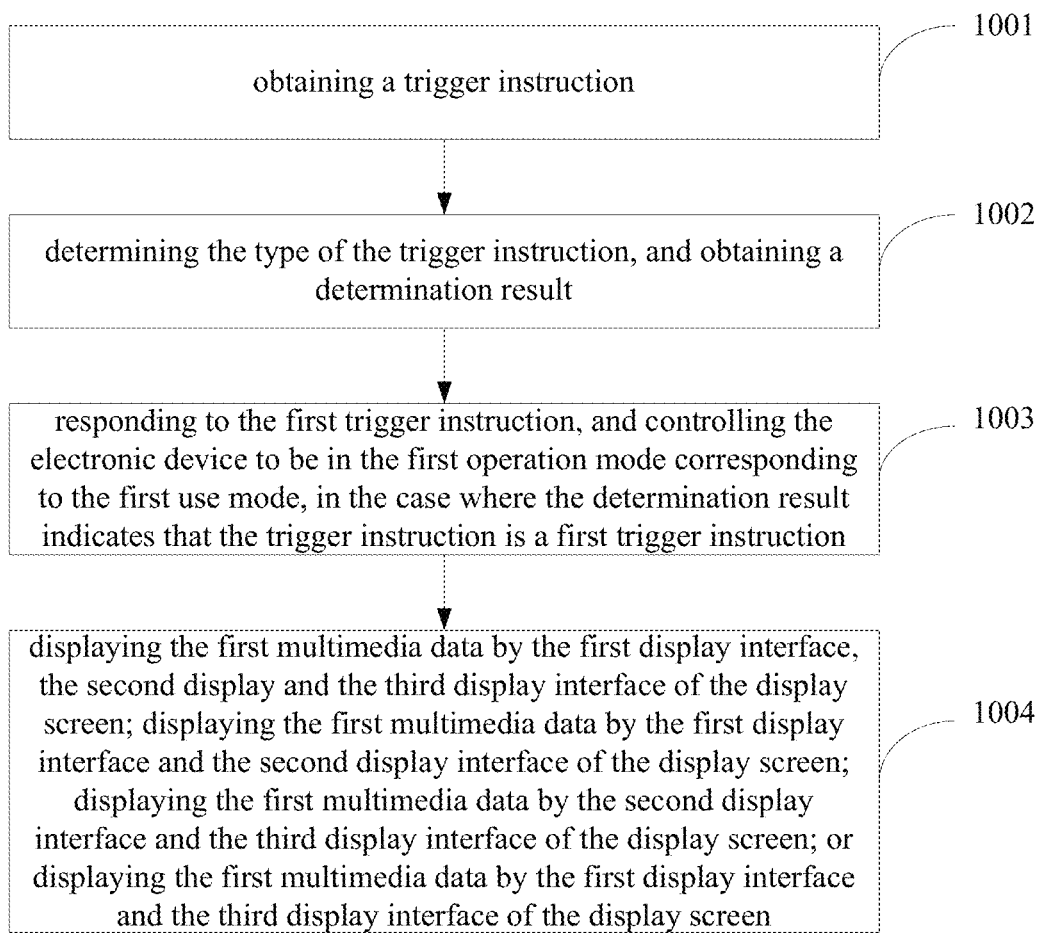
FIG. 10 is a flow chart of an example of a method for processing information according to an embodiment of the present invention.

FIG. 10 is a flow chart of a method for processing information according to embodiment 14 of the present invention, and the method for processing information of the present embodiment is applied to an electronic apparatus, the electronic apparatus includes a flexible display screen, a first member connected to a first end of the display screen by a first connection member and a second member connected to a second end of the display screen by a second connection member, the first member and the second member are flexible; the display screen can be formed into a first state, a second state or a third state; the first state, the second state and the third state are all different; the first member and the second member are used to maintain a relative position relationship between the electronic apparatus and the user's wrist or head; the first member and the second member can maintain a first relative position relationship between the electronic apparatus and the user's wrist; the first member and the second member can maintain a second relative position relationship between the electronic apparatus and the user's head; the first relative position relationship is different from the second relative position relationship; as shown in FIG. 10, the method for processing information includes steps 1001 to 1005.

In step 1001: obtaining a trigger instruction.

Particularly, a user of the electronic apparatus causes the electronic apparatus to be worn on the user's wrist by adjusting bend degrees of the first member, the second member, and the display screen, the user may use the electronic apparatus as a smart watch, and here, it is required for the electronic apparatus to be switched to a first operation mode. A user of the electronic apparatus causes the electronic apparatus to be worn on the user's head by adjusting bend degrees of the first member, the second member, and the display screen, the user may use the electronic apparatus as smart glasses, and here, it is required for the electronic apparatus to be switched to a second operation mode. A user of the electronic apparatus causes the electronic apparatus to assume a planar shape by adjusting bend degrees of the first member, the second member, and the display screen, the user may use the electronic apparatus as a smart phone, and here, it is required for the electronic apparatus to be switched to a third operation mode.

Based on this, the user can trigger different instructions to enable the electronic apparatus to be switched to a corresponding operation mode.

In step 1002: determining the type of the trigger instruction, and obtaining a determination result.

Here, according to types, the trigger instructions can be classified into a first trigger instruction, a second trigger instruction and a third trigger instruction; the first trigger instruction corresponds to the first operation mode, the second trigger instruction corresponds to the second operation mode, and the third trigger instruction corresponds to the third operation mode.

In step 1003: responding to the first trigger instruction, and controlling the electronic apparatus to be in the first operation mode corresponding to the first use mode, in the case where the determination result indicates that the trigger instruction is a first trigger instruction.

In step 1004: displaying the first multimedia data by the first display interface, the second display and the third display interface of the display screen; displaying the first multimedia data by the first display interface and the second display interface of the display screen; displaying the first multimedia data by the second display interface and the third display interface of the display screen; or displaying the first multimedia data by the first display interface and the third display interface of the display screen.

In the embodiment of the present invention, in the case where the electronic apparatus is in the first use mode, the display screen is formed into the first state, and the first member and the second member maintains the first relative position relationship between the electronic apparatus and the user's wrist;

in the case where the electronic apparatus is in the second use mode, the display screen is formed into the second state, and the first member and the second member maintains the second relative position relationship between the electronic apparatus and the user's head;

in the case where the electronic apparatus is in the third use mode, the display screen is formed into the second state.

It should be appreciated by persons skilled in the art that functions that can be implemented by the electronic apparatus in the method for processing information shown in FIG. 10 can be referred to the foregoing related description of the electronic apparatus.

Embodiment 15

Figure 11:
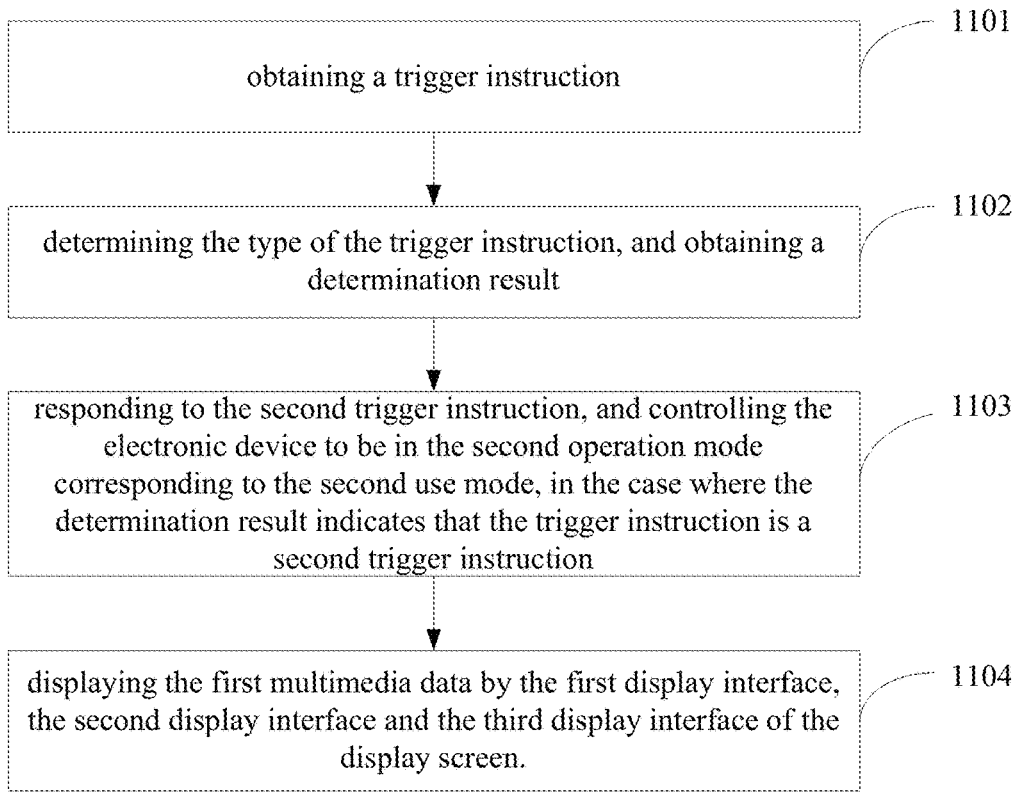
FIG. 11 is a flow chart of an example of a method for processing information according to an embodiment of the present invention.

FIG. 11 is a flow chart of a method for processing information according to embodiment 15 of the present invention, and the method for processing information of the present embodiment is applied to an electronic apparatus, the electronic apparatus includes a flexible display screen, a first member connected to a first end of the display screen by a first connection member and a second member connected to a second end of the display screen by a second connection member, the first member and the second member are flexible; the display screen can be formed into a first state, a second state or a third state; the first state, the second state and the third state are all different; the first member and the second member are used to maintain a relative position relationship between the electronic apparatus and the user's wrist or head; the first member and the second member can maintain a first relative position relationship between the electronic apparatus and the user's wrist; the first member and the second member can maintain a second relative position relationship between the electronic apparatus and the user's head; the first relative position relationship is different from the second relative position relationship; as shown in FIG. 11, the method for processing information includes steps 1101 to 1105.

In step 1101: obtaining a trigger instruction.

Particularly, a user of the electronic apparatus causes the electronic apparatus to be worn on the user's wrist by adjusting bend degrees of the first member, the second member, and the display screen, the user may use the electronic apparatus as a smart watch, and here, it is required for the electronic apparatus to be switched to a first operation mode. A user of the electronic apparatus causes the electronic apparatus to be worn on the user's head by adjusting bend degrees of the first member, the second member, and the display screen, the user may use the electronic apparatus as smart glasses, and here, it is required for the electronic apparatus to be switched to a second operation mode. A user of the electronic apparatus causes the electronic apparatus to assume a planar shape by adjusting bend degrees of the first member, the second member, and the display screen, the user may use the electronic apparatus as a smart phone, and here, it is required for the electronic apparatus to be switched to a third operation mode.

Based on this, the user can trigger different instructions to enable the electronic apparatus to be switched to a corresponding operation mode.

In step 1102: determining the type of the trigger instruction, and obtaining a determination result.

Here, according to types, the trigger instructions can be classified into a first trigger instruction, a second trigger instruction and a third trigger instruction; the first trigger instruction corresponds to the first operation mode, the second trigger instruction corresponds to the second operation mode, and the third trigger instruction corresponds to the third operation mode.

In step 1103: responding to the second trigger instruction, and controlling the electronic apparatus to be in the second operation mode corresponding to the second use mode, in the case where the determination result indicates that the trigger instruction is a second trigger instruction.

In step 1104: displaying the first multimedia data by the first display interface, the second display interface and the third display interface of the display screen.

In the embodiment of the present invention, in the case where the electronic apparatus is in the first use mode, the display screen is formed into the first state, and the first member and the second member maintains the first relative position relationship between the electronic apparatus and the user's wrist;

in the case where the electronic apparatus is in the second use mode, the display screen is formed into the second state, and the first member and the second member maintains the second relative position relationship between the electronic apparatus and the user's head;

in the case where the electronic apparatus is in the third use mode, the display screen is formed into the second state.

It should be appreciated by persons skilled in the art that functions that can be implemented by the electronic apparatus in the method for processing information shown in FIG. 11 can be referred to the foregoing related description of the electronic apparatus.

Embodiment 16

Figure 12:
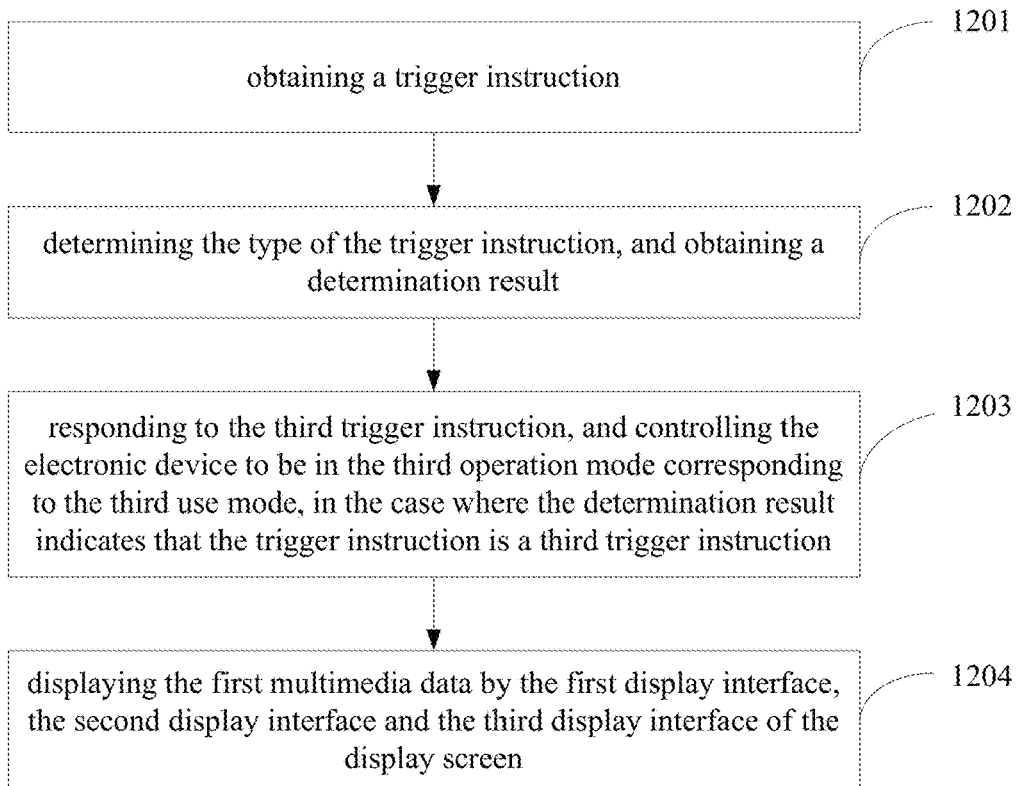
FIG. 12 is a flow chart of an example of a method for processing information according to an embodiment of the present invention.

FIG. 12 is a flow chart of a method for processing information according to embodiment 16 of the present invention, and the method for processing information of the present embodiment is applied to an electronic apparatus, the electronic apparatus includes a flexible display screen, a first member connected to a first end of the display screen by a first connection member and a second member connected to a second end of the display screen by a second connection member, the first member and the second member are flexible; the display screen can be formed into a first state, a second state or a third state; the first state, the second state and the third state are all different; the first member and the second member are used to maintain a relative position relationship between the electronic apparatus and the user's wrist or head; the first member and the second member can maintain a first relative position relationship between the electronic apparatus and the user's wrist; the first member and the second member can maintain a second relative position relationship between the electronic apparatus and the user's head; the first relative position relationship is different from the second relative position relationship; as shown in FIG. 12, the method for processing information includes steps 1201 to 1205.

In step 1201: obtaining a trigger instruction.

Particularly, a user of the electronic apparatus causes the electronic apparatus to be worn on the user's wrist by adjusting bend degrees of the first member, the second member, and the display screen, the user may use the electronic apparatus as a smart watch, and here, it is required for the electronic apparatus to be switched to a first operation mode. A user of the electronic apparatus causes the electronic apparatus to be worn on the user's head by adjusting bend degrees of the first member, the second member, and the display screen, the user may use the electronic apparatus as smart glasses, and here, it is required for the electronic apparatus to be switched to a second operation mode. A user of the electronic apparatus causes the electronic apparatus to assume a planar shape by adjusting bend degrees of the first member, the second member, and the display screen, the user may use the electronic apparatus as a smart phone, and here, it is required for the electronic apparatus to be switched to a third operation mode.

Based on this, the user can trigger different instructions to enable the electronic apparatus to be switched to a corresponding operation mode.

In step 1202: determining the type of the trigger instruction, and obtaining a determination result.

Here, according to types, the trigger instructions can be classified into a first trigger instruction, a second trigger instruction and a third trigger instruction; the first trigger instruction corresponds to the first operation mode, the second trigger instruction corresponds to the second operation mode, and the third trigger instruction corresponds to the third operation mode.

In step 1203: responding to the third trigger instruction, and controlling the electronic apparatus to be in the third operation mode corresponding to the third use mode, in the case where the determination result indicates that the trigger instruction is a third trigger instruction.

In step 1104: displaying the first multimedia data by the first display interface, the second display interface and the third display interface of the display screen.

In the embodiment of the present invention, in the case where the electronic apparatus is in the first use mode, the display screen is formed into the first state, and the first member and the second member maintains the first relative position relationship between the electronic apparatus and the user's wrist;

in the case where the electronic apparatus is in the second use mode, the display screen is formed into the second state, and the first member and the second member maintains the second relative position relationship between the electronic apparatus and the user's head;

in the case where the electronic apparatus is in the third use mode, the display screen is formed into the second state.

It should be appreciated by persons skilled in the art that functions that can be implemented by the electronic apparatus in the method for processing information shown in FIG. 12 can be referred to the foregoing related description of the electronic apparatus.

When integrated modules according to embodiments of the present invention are implemented by functional modules in software and be sold or used in the form of an independent product, they may be stored in a computer readable storage medium. Based on such an understanding, essence in the technical solution of the embodiments of the present invention or parts contributing to the prior art may be embodied in the form of a software product which may be stored in a storage medium, and includes several instructions to cause a computer device (may be a personal computer, a server, or a network equipment) to perform all or part of the method according to various embodiments of the present invention. The storage medium comprises: a U disk, a mobile hard disk, a read-only memory (ROM), a random access memory (RAM), a disk, a CD-ROM or other medium capable of storing program code thereon. Thus, embodiments of the present invention are not limited to any specific combination of hardware and software.

Only preferred embodiments of the present invention are described above, and are not intended to limit the scope of the present invention.

The invention claimed is:

1. A method for processing information applied to an electronic apparatus, wherein the electronic apparatus comprises a fixing unit and a display unit, the fixing unit is configured to maintain a first relative position relationship between the electronic apparatus and a user's wrist; the fixing unit is configured to maintain a second relative position relationship between the electronic apparatus and the user's head; the display unit is fixedly provided on the fixing unit and is operable to adjust transparency; the electronic apparatus further includes a gravity sensor configured to issue a second trigger instruction in a case where the gravity sensor satisfies a second preset parameter value, wherein the method comprises:
  obtaining a first trigger instruction, which is triggered by the user by adjusting a bending degree of the electronic apparatus, for indicating whether to initiate a first use mode of the electronic apparatus, wherein in the case where the electronic apparatus is in the first use mode, the fixing unit maintains the first relative position relationship with the user's wrist;
  controlling the electronic apparatus to be in a first operation mode corresponding to the first use mode, in response to the first trigger instruction;
  obtaining the second trigger instruction, which is issued by the gravity sensor in the case where the gravity sensor satisfies the second preset parameter value, for indicating whether to initiate a second use mode of the electronic apparatus, wherein in the case where the electronic apparatus is in the second use mode, the fixing unit maintains the second relative position relationship with the user's head; the first use mode is different from the second use mode; and
  controlling the electronic apparatus to be in a second operation mode corresponding to the second use mode, in response to the second trigger instruction; wherein the first operation mode is different from the second operation mode, and wherein the step of controlling the electronic apparatus to be in the first operation mode corresponding to the first use mode, in response to the first trigger instruction, further comprises:

determining that the fixing unit is located at the first relative position based on a first trigger instruction;

responding to the first trigger instruction, and controlling the electronic apparatus to be in the first operation mode corresponding to the first use mode; and performing a watch operation mode of the electronic apparatus and displaying first multimedia data by a display screen, the step of controlling the electronic apparatus to be in the second operation mode corresponding to the second use mode, in response to the second trigger instruction, comprises:

determining that the fixing unit is switched to the second relative position from the first relative position based on the second preset parameter value, initiating the display unit, controlling the electronic apparatus to be in a display and sound output mode, and performing a glasses operation mode of the electronic apparatus corresponding to the display and sound output mode.

* * * * *